(12) United States Patent
Deng et al.

(10) Patent No.: US 8,084,119 B2
(45) Date of Patent: Dec. 27, 2011

(54) MOBILE PHONE SHELL AND METHOD OF MANUFACTURING THE SAME

(75) Inventors: Wen Deng, Shenzhen (CN); Tao Chen, Shenzhen (CN); Hengliang Jiang, Shenzhen (CN); Dan Hu, Shenzhen (CN); Jianming Yang, Shenzhen (CN); Xuan Huang, Shenzhen (CN); Min Fang, Shenzhen (CN); Miao Gao, Shenzhen (CN); Yongfen Xiao, Shenzhen (CN); Bing Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 12/639,944

(22) Filed: Dec. 16, 2009

(65) Prior Publication Data

US 2010/0167027 A1 Jul. 1, 2010

(30) Foreign Application Priority Data

Dec. 26, 2008 (CN) .......................... 2008 1 0187604
Dec. 26, 2008 (CN) .......................... 2008 1 0187605

(51) Int. Cl.
*H04M 1/00* (2006.01)

(52) U.S. Cl. .................. 428/195.1; 428/320.2; 428/343; 428/344; 428/353; 428/354; 428/425.8; 428/913.3; 455/575.1; 455/575.8

(58) Field of Classification Search ............... 428/195.1, 428/320.2, 913.3, 343, 344, 353, 354, 425.8; 455/575.1, 575.8
See application file for complete search history.

(56) References Cited

U.S. PATENT DOCUMENTS

| | | | |
|---|---|---|---|
| 5,017,417 A * | 5/1991 | Miyazawa et al. | 428/195.1 |
| 6,465,102 B1 * | 10/2002 | Honigfort et al. | 428/412 |
| 7,662,327 B2 * | 2/2010 | Hsu | 264/245 |
| 7,759,588 B2 * | 7/2010 | Hsu | 200/5 A |
| 7,781,062 B2 * | 8/2010 | Kitaike et al. | 428/407 |

FOREIGN PATENT DOCUMENTS

| | | |
|---|---|---|
| JP | 2000-196718 | 7/2000 |
| JP | 2002-229007 | 8/2002 |
| WO | WO 2006/112707 | 10/2006 |
| WO | WO 2010/025690 | 3/2010 |

* cited by examiner

*Primary Examiner* — Cathy Lam
(74) *Attorney, Agent, or Firm* — Alston & Bird LLP

(57) ABSTRACT

An outer shell of a mobile phone, the outer shell comprises a substrate, a semi-transparent coating formed on the substrate, and an opaque layer partially formed on the opposite side from the semi-transparent coating, wherein the substrate includes at least two sub-areas, a first sub-area overlaps a second sub-area to form a first overlapping area showing a mixture of colors between a first color and a second color.

10 Claims, 4 Drawing Sheets

US 8,084,119 B2

MOBILE PHONE SHELL AND METHOD OF MANUFACTURING THE SAME

CROSS-REFERENCE TO RELATED APPLICATION

This application claims foreign priority benefits under 35 U.S.C. §119 to Chinese Patent Application Serial No. 200810187605.0, filed on Dec. 26, 2008, and Chinese Patent Application Serial No. 200810187604.6, filed on Dec. 26, 2008, the disclosures of which are incorporated herein by reference.

TECHNICAL FIELD

The present invention relates to mobile phones and manufacturing methods thereof, and more particular to outer shells of mobile phones and methods for manufacturing the same.

BACKGROUND

Mobile electronic devices such as mobile phones, portable digital assistants (PDAs), MP3 players and the like generally include an outer shell, a display screen and a backlight unit. In regular operations, once actions/features are triggered, e.g., by briefly pressing a button, the display screen becomes active. The display screen is illuminated by the backlight unit to display a variety of information such as phone calls, pictures, text messages or the like on the screens. When the mobile device has not been used for a while, it enters a sleep mode and automatically turns off the display. The display screen is still visible, however, which may affect the entire visual effect of the mobile electronic device and is often not desirable.

BRIEF SUMMARY

According to one exemplary embodiment of the invention, an outer shell of a mobile phone comprises a substrate, a semi-transparent coating formed on the substrate and an opaque layer partially formed on the opposite side from the semi-transparent coating. In one embodiment, the semi-transparent coating having a transmittance rate of less than 12%.

According to one exemplary embodiment of the invention, a method of manufacturing an outer shell of a mobile phone comprises providing a substrate, providing a semi-transparent coating on the substrate and forming an opaque layer partially on the opposite side from the semi-transparent coating.

According to one exemplary embodiment of the invention, a method of manufacturing an outer shell of a mobile phone comprises providing a substrate, spraying a first coat of paint containing a first color to a first sub-area of the substrate, and spraying a second coat paint containing a second color, different from the first color, to a second sub-area of the substrate. The first sub-area overlaps the second sub-area to form a first overlapping area showing a mix of color between the first color and the second color.

BRIEF DESCRIPTION OF THE DRAWINGS

The foregoing summary, as well as the following detailed description of the invention, will be better understood when read in conjunction with the appended drawings. The embodiments illustrated in the figures of the accompanying drawings herein are by way of example and not by way of limitation. In the drawings.

DETAILED DESCRIPTION

Figure 1:
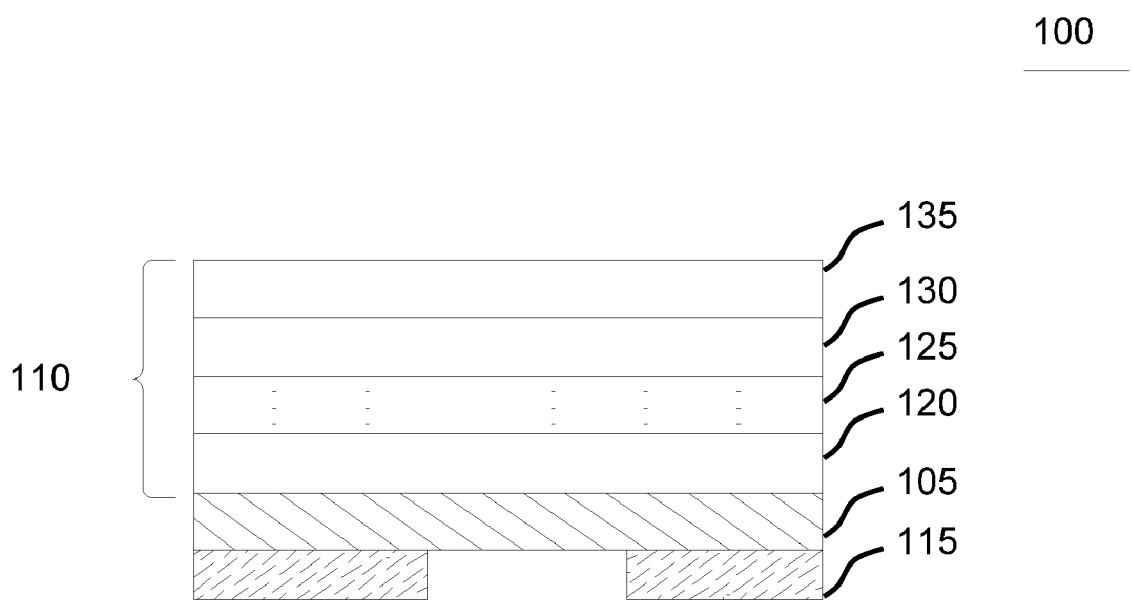
FIG. 1 illustrates a cross-sectional view of an outer shell of a mobile electronic device according to one exemplary embodiment of the present invention.

FIG. 1 illustrates a cross-sectional view of an outer shell of a mobile electronic device according to one exemplary embodiment of the present invention. In this embodiment, the mobile electronic device is a mobile phone. As shown in FIG. 1, an outer shell 100 of the mobile phone (not numbered) comprises a substrate 105, a semi-transparent coating 110 formed on the substrate 105 and an opaque layer 115 partially formed on the opposite side from the semi-transparent coating 110. The semi-transparent coating 110 further comprises a primer layer 120 formed on the substrate 105, a metal layer 125 formed on the primer layer 120, a middle layer 130 formed on the metal layer 125 and a top layer 135 formed on the middle layer 130. For desired visual effects, the transmittance rate of the semi-transparent coating 110 is about less than 12%, preferably about 2-10%. At these transmittance rates, the display screen of the mobile phone may be invisible from the outer shell.

A number of materials can be used as the substrate 105 of the outer shell 100. In one exemplary embodiment, the substrate 105 may be polycarbonate (PC) with a weight average molecular weight of about 12,000-18,000. In another exemplary embodiment, the substrate 105 may be polymethyl methacrylate (PMMA) with a weight average molecular weight of about 20,000-200,000. In other exemplary embodiments, the substrate 105 may be acrylonitrile-butadiene-styrene (ABS) or metal such as stainless steel. In one embodiment, the thickness of the substrate 105 is approximately 2 millimeters. The substrate 105 may have a transmittance rate of about 85-92% to meet the requirements of the transmittance rate of the semi-transparent coating 110.

An ion bombardment process may be applied to the substrate 105 for 2-5 minutes prior to depositing the semi-transparent coating 110 to the substrate 105 so as to reduce the internal stress of the semi-transparent coating 110 and to increase the compactness and adhesion strength of the semi-transparent coating 110. The ion bombardment process may be applied in a vacuum evaporator in a pressure environment as low as about $1\times10^{-3}$-$8\times10^{-3}$ Pa.

The opaque layer 115 is partially formed on the substrate 105 opposite the semi-transparent coating 110. The deposition area of the opaque layer 115 is determined by the size of the display screen. The width of the opaque layer 115 may be about 5-70% of the width of the substrate 105 so that the variety of information can be displayed on the display screen without obstruction. The thickness of the opaque layer 115 is about 5-20 µm. Specifically, the width of the opaque layer 115 is about 8 millimeters and the thickness is about 10 µm.

The opaque layer 115 can be any paint layer with the property of opaqueness. For example, the opaque layer 115 may be a BS-002 mono-component coating sold by Meilihua Company. In a specific embodiment, the paint of the opaque layer 115 is formed by mixing primer (e.g., Meilihua BS-002) and diluents (e.g., Meilihua BS-02) at a ratio of about 2:1 to achieve a viscosity of about 9-12 seconds. After the deposition of the opaque layer 115, the substrate is then baked for about 10 minutes at 65° C.

The primer layer 120 of the semi-transmittance layer 110 is formed on the substrate 105 opposite the opaque layer 115. The primer layer 120 may have a transmittance rate of about 95-100%. The thickness of the primer layer 120 can be adjusted so long as the requirement of the transmittance rate is satisfied. In one exemplary embodiment, the thickness of the primer layer 120 is about 5-30 μm. Preferably, the thickness of the primer layer 120 is about 10-20 μm. The primer layer 120 can be any paint. In one exemplary embodiment, the primer layer 120 may be a UV-curing coating sold by Tianjin Shanshui Company and has a transmittance rate of 98-100%.

In a specific exemplary embodiment, the paint of the primer layer 120 is formed by mixing primer with diluents at a ratio of approximately 1.5:1. The mixture of primer and diluents may have a viscosity of about 7-9 seconds in this embodiment. Specifically, the primer layer 120 has a thickness of 16 μm and a transmittance rate of 99%.

The metal layer 125 is formed on the primer layer 120 as shown in FIG. 1. The thickness of the metal layer 125 is about 20-100 nm, preferably about 20-60 nm. The transmittance rate is about 5-60% which is determined by the thickness of the metal layer 125. The material of the metal layer 125 can be one of In, Sn, Al, Ni, Cr, Cu, Ag and Ti according to the requirement of the metallic effect of the outer shell 100.

The metal layer 125 is deposited on the primer layer 120 by using one of electroplating method, electroless method or physical vapor deposition method. The vacuum evaporation of physical vapor deposition method is preferably applied because a more uniform distribution may be obtained and the metal layer 125 may adhere strongly to the surface of the primer layer 120. By applying the vacuum evaporation method, the metal granules may be heated, melted and then evaporated onto the to-be-deposited surface. The amount of the metal granules may determine the transmittance rate of the metal layer 125. In one exemplary embodiment, 15-30% of the transmittance rate is obtained when 0.03-0.05 grams metal granules are evaporated onto 1 square centimeter of the to-be-deposited surface. In this embodiment, the to-be-deposited surface is the surface of the primer layer 120. Generally, 0.01-0.08 grams metal granules are evaporated onto the to-be-deposited surface when an 800-centimeter diameter vacuum evaporator is used. The vacuum evaporation may take place in a gas pressure range of $1 \times 10^{-3}$-$8 \times 10^{-3}$ Pa.

The vacuum evaporation process comprises a resistance heating method, an electron beam heating method and an induction heating method or any other methods known to one skilled in the art according to various heating sources. The resistance heating method is widely used because it is easy to implement and of its comparably low price. The electron beam heating method is suitable for large scale applications and thin-film fabrications. The induction heating method requires complicated peripheral equipment. In exemplary embodiments, the metal granules are released from the metal layer 125 and transferred to the surface of the primer layer 120 using resistance heating method or electron beam heating method. When the resistance heating method is used, the power density of the resistance heating is about 10-40% of full power.

Figure 2:
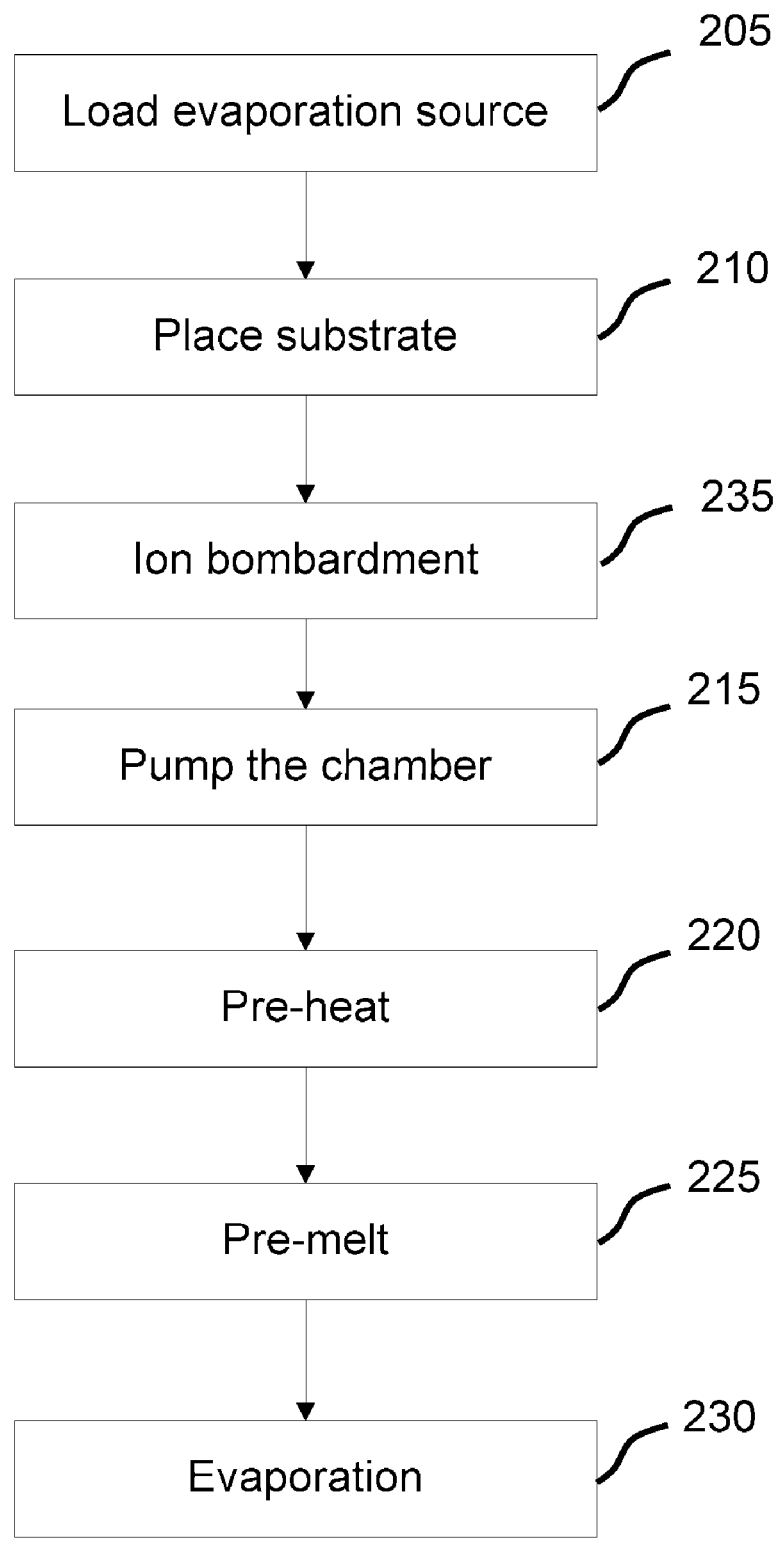
FIG. 2 illustrates a flow chart of a vacuum evaporation process according to one exemplary embodiment of the present invention.

FIG. 2 illustrates an exemplary embodiment in the vacuum evaporation process that comprises the following steps. At step 205, materials to be evaporated are loaded in a tungsten boat (not numbered) as an evaporation source. In this embodiment, Sn granules are loaded in the tungsten boat as the evaporation source. Two ends of the tungsten boat are respectively connected to an anode and a cathode of a vacuum chamber (not numbered) in a vacuum evaporator (e.g., a Taibei Vacuum vaporator, TPM-1618-36V-1). At step 210, a substrate is placed in the vacuum chamber. To create a vacuum environment, the vacuum chamber is pumped to a pressure of approximately $1 \times 10^{-3}$-$8 \times 10^{-3}$ Pa at step 215. In the low pressure-environment, the tungsten boat containing metal granules is resistively pre-heated at approximately 10-35% of full power at step 220. The pre-heat step 220 may last approximately 10-25 seconds. At step 225, the tungsten boat is continued to be heated at approximately 25-40% of full power to pre-melt the metal granules. The pre-melt step 225 may last approximately 15-50 seconds in order to heat the metal granules with a slight increase in temperature for the purpose of preventing the metal granules from splashing in subsequent steps. At step 230, the tungsten boat is heated at approximately 30-60% of full power until the metal granules melt and begin to evaporate. At the step of evaporation, the metal granules become atoms and gas molecules in certain metals. The metal gas molecules are deposited onto the substrate at a rate of approximately 3-10 angstrom/second which may be monitored by an optical film monitor. The metal layer 125 is accordingly formed, for example, on the metal layer 125 due to the deposition of the metal gas molecules.

In a specific exemplary embodiment, the vacuum chamber is pumped to a pressure of approximately $2 \times 10^{-3}$ pa at step 215. The tungsten boat is resistively pre-heated for 25 seconds at approximately 34% of full power at step 220. At step 225, the tungsten boat is continued to be heated for 45 seconds at approximately 40% of full power to pre-melt the metal granules. At step 230, the tungsten boat is heated at approximately 46% of full power until the metal granules melt and begin to evaporate. The metal gas molecules are deposited onto the surface of the substrate at a rate of approximately 10 angstrom/second. In this embodiment, the metal layer 120 has a thickness of 20 nm and a transmittance rate of 30%.

An additional step 235 may be taken prior to the step 215 for forming a high quality metal layer. In this additional step, an ion bombardment process is used. During the ion bombardment process, the substrate is bombarded with ions for approximately 2-5 minutes for the purpose of reducing the internal stress, and increasing the compactness and adhesion strength of the layer to be deposited to the substrate.

Referring again to FIG. 1, the middle layer 130 may be formed by depositing a coating of paint onto the surface of the metal layer 125. The thickness of the middle layer 130 is approximately 5-30 μm, preferably about 5-15 μm. The transmittance rate of the middle layer 130 is approximately 5-85% which is determined by the thickness of the middle layer 130. The middle layer 130 may be formed by a mixture of primer and pigment. Generally the weight ratio of the pigment to the primer is less than 1:10 to meet the transmittance rate which may be measured by a spectrophotometer. The viscosity of the paint may be 7-10 seconds depending on the weight ratio of the pigment to the primer. In one exemplary embodiment, the primer may be Cashew VM9000 sold by Tianjin Shanshui Company. The pigment may be the Cashew pigment sold by Tianjin Shanshui Company. The color of the pigment may be one or combination of red, yellow, purple, blue and black.

In a specific exemplary embodiment, the paint may be a mixture of primer, diluents and curing agent at a ratio of approximately 1:2:0.1 and may have a viscosity of 8.2 seconds. The primer may have a transmittance rate of about 99%.

Specifically, the primer may be Cashew VM9000 sold by Tianjin Shanshui Company. The diluents may be Cashew 9002 sold by Tianjin Shanshui Company. The curing agent may be Cashew KM-2 sold by Tianjin Shanshui Company.

In a specific embodiment, about 3% by volume of red pigment and about 2% by volume of black pigment are respectively added to and mixed with the above primer sufficiently which may obtain a red paint and a black paint. Each of the red paint and black paint has a transmittance rate of 25%. The red paint or the black paint is then deposited to the corresponding areas of the metal layer 125 alternatively. In one exemplary embodiment, the paint is deposited by a spray gun (not numbered). The spray gun may be positioned at a distance of approximately 30-100 cm above the substrate 105 with a spray angle of about 10-80°. Distance between adjacent spray guns may be about 20-50 cm. In a specific embodiment, the spray gun is positioned preferably 60 cm above the substrate 105 at an angle of about 60°. The distance between adjacent spray guns is preferably 30 cm. After the deposition of the middle layer 130 to the metal layer 125, the substrate is baked at 80° C. for about 20 minutes. A middle layer having a thickness of about 15 μm and a transmittance rate of 24.7% is accordingly obtained in this specific embodiment. In an exemplary embodiment, the middle layer 130 may be deposited using multi-color spray method to form specific areas showing a natural color gradient effect.

Figure 3:
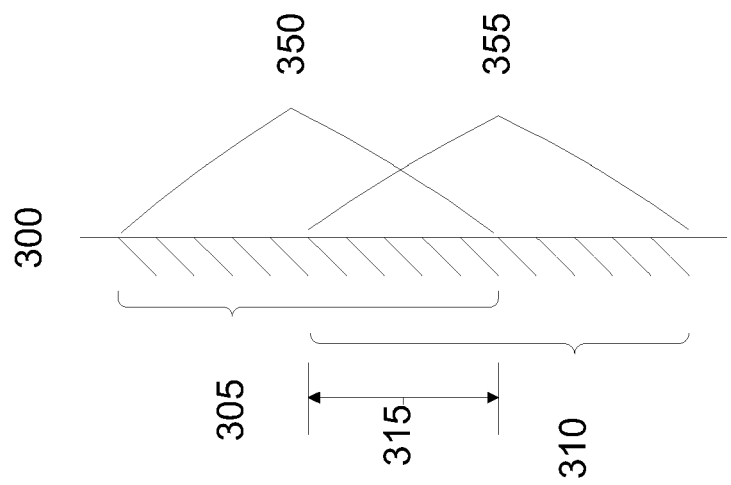
FIG. 3 illustrates a method of a spraying process according to one exemplary embodiment of the present invention.

In one specific embodiment, by using the multi-color spray method, the surface of a to-be-deposited layer 300 is divided into at least two sub-areas. Referring to FIG. 3, the two sub-areas are a first sub-area 305 and a second sub-area 310. The first sub-area 305 overlaps the second sub-area 310 to form an overlapping area 315.

A plurality of spray guns is positioned above the to-be-deposited layer 300 with predetermined parameters such as distance above the to-be-deposited layer, distance between adjacent spray guns, spray angles and spray ranges or the like. Two spray guns, a first spray gun 350 and a second spray gun 355, are used in an exemplary embodiment illustrated in FIG. 3. The first spray gun 350 contains a first paint of a first color. The second spray gun 355 contains a second paint of a second color which is different from the first color. As shown in FIG. 3, the first spray gun 350 sprays the first paint to the first sub-area 305. The second spray gun 355 sprays the second paint to the second sub-area 310 simultaneously or subsequently of the spraying process of the first spray gun 350. Preferably, the first spray gun 350 and the second spray gun 355 spray to the corresponding sub-areas. In this regard, the overlapping area 315 may receive paint from both the first spray gun 350 and the second spray gun 355. As the result, the overlapping area 315 may show a mix of colors. The mixed color may be an intermediate color when the first color is a primary color and the second color is a secondary color in a given color space such as RGB or RYB. Alternatively, the mixed color may be a tertiary color when the first color and the second color are both secondary colors in the color space. As known to one skilled in the art, the first color and the second color may also be any color in the color space to form the mixed color. Specifically, the first color is selected from colors of red, yellow, purple, blue and black. The overlapping area 315 thus shows a color gradient effect as a consequence of mixing the first color with the second color. The size of the overlapping area 315 varies from the predetermined parameters of the spray guns. The to-be-deposited layer 300 in this embodiment is the substrate 105 with the primer layer 120 on the substrate 105 and the metal layer 125 formed on the primer layer 120 as shown in FIG. 1.

Figure 4:
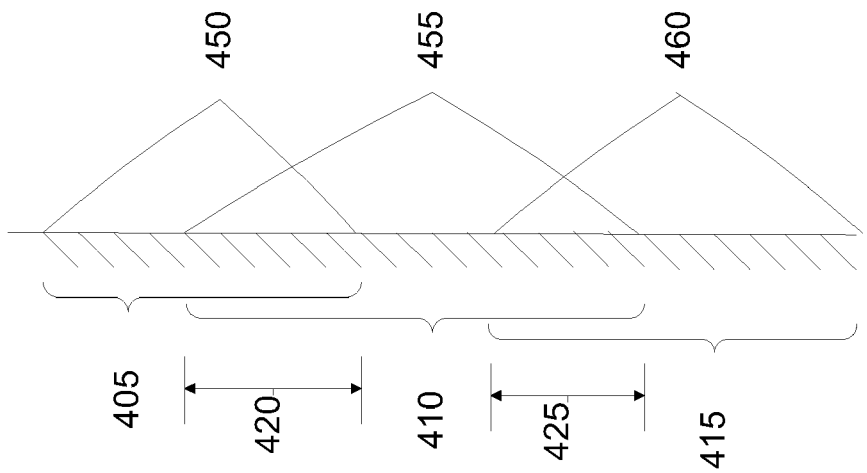
FIG. 4 illustrates a method of a spraying process according to another exemplary embodiment of the present invention.

In another exemplary embodiment, the surface of the to-be-deposited layer 300 may be divided into at least three sub-areas. As an exemplary embodiment illustrated in FIG. 4, the sub-areas comprise a first sub-area 405, a second sub-area 410 and a third sub-area 415. The first sub-area 405 overlaps the second sub-area 410 to form a first overlapping area 420. The second sub-area 410 overlaps the third sub-area 415 to form a second overlapping area 425.

In this embodiment, three spray guns, a first spray gun 450, a second spray gun 455 and a third spray gun 460, are used to deposit the paint to the to-be-deposited layer 300. The first spray gun 450 contains a first paint of a first color. The second spray gun 455 contains a second paint of a second color which is different from the first color. The third spray gun 460 contains a third paint of a third color which is different from the second color. The first spray gun 450 sprays the first paint to the first sub-area 405. The second spray gun 455 sprays the second paint to the second sub-area 410 simultaneously or subsequently. The third spray gun 460 sprays the third paint to the third sub-area 415 simultaneously from the first and/or second spray gun, or subsequent to either of the first or second spray gun. Preferably, the first spray gun 450, the second spray gun 455, and the third spray gun 460 spray to the corresponding sub-areas in consecutive order. In this manner, the first overlapping area 420 may receive both the first paint and the second paint to form a first mixed color which mixes the first color with the second color. The second overlapping area 425 may receive both the second paint and the third paint to form a second mixed color by mixing the second color and the third color. As described above, both the first overlapping area 420 and the second overlapping area 425 therefore have a color gradient effect as a consequence of mixing two different colors. The sizes of the first overlapping area 420 and the second overlapping area 425 vary from the predetermined parameters of the spray guns as shown in FIG. 3.

There may be a gradual reduction of layer thickness from the areas which are the closest to the spray nozzles to the relatively further areas. However, the overlapping areas may receive slightly more paint which may result in a uniform thickness of the entire layer.

Figure 5:
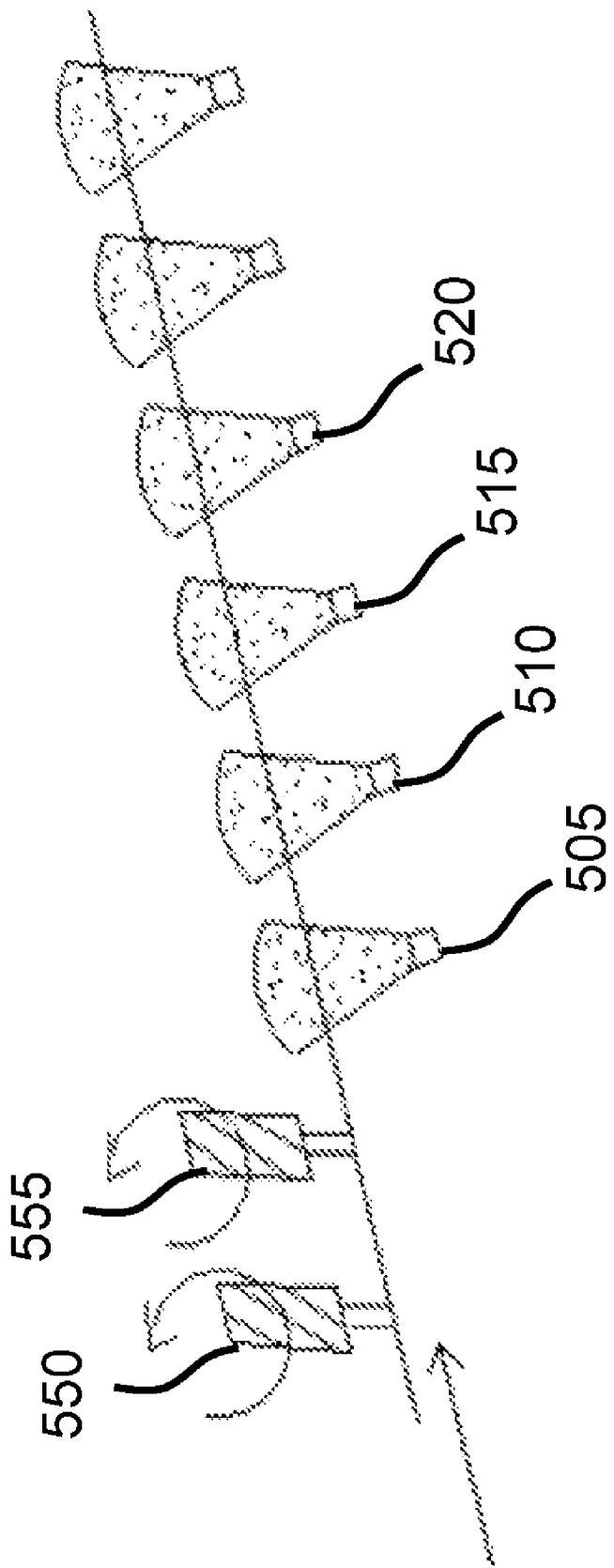
FIG. 5 illustrates a method of a spraying process in a paint line according to one exemplary embodiment of the present invention.

FIG. 5 illustrates a method of spraying process in a paint line according to one exemplary embodiment of the present invention. In the paint line, there are a number of spray guns. Every other spray gun may contain a paint of the same color. For example, a first spray gun 505 and a third spray gun 515 may contain a first paint of a first color. A second spray gun 510 and a fourth spray gun 520 may contain a second paint of a second color which is different from the first color. There are a plurality of substrates to be sprayed. In an exemplary embodiment, a first substrate 550 and a second substrate 555 are placed in the paint line. Each substrate is divided into at least two sub-areas as described in FIG. 3. In a first step, the first substrate 550 is subject to the first spray gun 505 to receive the first paint on corresponding sub-areas (e.g., the first sub-area 305 of the first substrate 550). In a second step, the first substrate 550 moves to the second spray gun 510 to receive the second paint on corresponding sub-area (e.g., the second sub-area 310 of the first substrate 550). At the same time, the second substrate 555 is subject to the first spray gun 505. The first spray gun 505 may spray the first paint to the corresponding sub-areas on the second substrate 555. In a third step, the first substrate 550 moves to the third spray gun 515 to receive the first paint from the third spray gun 515. The second substrate 555 is then subject to the second spray gun 510 to receive the second paint. As the result, overlapping areas of the first substrate 550 and the second substrate 555 which received both the first paint and the second paint may show a mixture of colors having a gradient color effect. The sizes of the overlapping areas are determined by the predetermined parameters of the spray guns.

Referring again to FIG. 1, a top layer 135 is formed on the middle layer 130 to protect the display screen. The transmittance rate of the top layer 135 is approximately 95-100%. The thickness of the top layer 135 is determined by satisfying the requirement of the transmittance rate. In an exemplary embodiment, the thickness of the top layer 135 is approximately 5-25 µm. Preferably the thickness is about 10-20 µm. The top layer 135 may be a UV-curing coating and may have a transmittance rate of 98-100%. Specifically, the UV-curing coating is Cashew VM 7302 sold by Tianjin Shanshui company.

In an exemplary embodiment, the paint of the top layer 135 is formed by mixing primer and diluents at a ratio of 10:8 and has a viscosity of about 7-9 seconds. After the deposition of the top layer 135, the substrate having plurality layers formed thereon is baked at 65° C. for approximately 8 minutes. Afterwards, the substrate is irradiated with ultraviolet radiation at a rate of about 1,600 mJ/cm$^2$ for about 25 seconds to enhance the stability of the coating. The intensity of energy of ultraviolet radiation is about 450 mW/cm$^2$. A top layer with a transmittance rate of approximately 99% and having a thickness of about 16 µm is obtained accordingly.

A method of manufacturing an outer shell of a mobile phone described above comprises providing a substrate 105, providing a semi-transparent coating 110 on the substrate 105, and partially forming an opaque layer 115 on the opposite side of the substrate 105 from the semi-transparent coating 110. The semi-transparent coating may have a transmittance rate of less than 12%. Providing the semi-transparent coating 110 may comprise forming a primer layer 120 on the substrate 105, forming a metal layer 125 on the primer layer 120, forming a middle layer 130 on the metal layer 125, forming a top layer 135 on the middle layer 130. The metal layer 125 may be formed using an electroplating method, an electrolysis method, a physical vapor deposition method, or other methods known to one skilled in the art. The middle layer film 130 may be formed using multi-color spray method to obtain a mixed color by mixing two different colors which may have a color gradient effect. The substrate 105 may be plastic, polycarbonate (PC), Polymethyl-methacrylate (PMMA) and metal or other material known to one skilled in the art. The metal layer 125 may be In, Sn, Al, Ni, Cr, Cu, Ag and Ti or any other material known to one skilled in the art.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. An outer shell of a mobile phone, the outer shell comprising:
   a substrate having opposing top and bottom surfaces;
   a semi-transparent coating formed on the top surface of the substrate; and
   an opaque layer partially formed on the bottom surface of the substrate, wherein the semi-transparent coating has a transmittance rate of less than 12%.

2. The outer shell of claim 1, wherein the semi-transparent coating further comprises
   a primer layer formed on the substrate,
   a metal layer formed on the primer layer,
   a middle layer formed on the metal layer, and
   a top layer formed on the middle layer.

3. The outer shell of claim 1, wherein the substrate comprises plastic, polycarbonate, Polymethyl-methacrylate or metal.

4. The outer shell of claim 1, wherein the opaque layer is in a thickness of 5-20 µm.

5. The outer shell of claim 2, wherein the metal layer comprises In, Sn, Al, Ni, Cr, Cu, Ag or Ti.

6. The outer shell of claim 2, wherein the middle layer comprises a first sub-area and a second sub-area, the first sub-area overlapping the second sub-area to form an overlapping area, the overlapping area showing a mixed color by mixing a first color with a second color.

7. The outer shell of claim 2, wherein the primer layer is in a thickness of 5-30 µm and has a transmittance rate of 95-100%.

8. The outer shell of claim 2, wherein the metal layer is in a thickness of 20-100 nm and has a transmittance rate of 5-60%.

9. The outer shell of claim 2, wherein the middle layer is in a thickness of 5-30 µm and has a transmittance rate of 5-85%.

10. The outer shell of claim 2, wherein the top layer is in a thickness of 5-25 µm and has a transmittance rate of 95-100%.

* * * * *